(12) United States Patent
Oral et al.

(10) Patent No.: US 7,974,871 B2
(45) Date of Patent: Jul. 5, 2011

(54) SYSTEM AND METHOD FOR REORDERING MEETING AGENDA ITEMS PRIOR TO THE OCCURRENCE OF THE MEETING BASED UPON PARTIAL PARTICIPATION BY THE MEETING PARTICIPANTS

(75) Inventors: Tolga Oral, Winchester, MA (US); Sergei R. Landar, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 1222 days.

(21) Appl. No.: 11/618,708

(22) Filed: Dec. 29, 2006

(65) Prior Publication Data

US 2008/0162244 A1 Jul. 3, 2008

(51) Int. Cl.
*G06F 17/00* (2006.01)

(52) U.S. Cl. .......................................................... 705/9

(58) Field of Classification Search .................... 705/9
See application file for complete search history.

(56) References Cited

U.S. PATENT DOCUMENTS

| | | |
|---|---|---|
| 6,938,069 B1 | 8/2005 | Narayanaswamy |
| 2005/0027800 A1 | 2/2005 | Erickson et al. |
| 2005/0050061 A1 | 3/2005 | Karstens |
| 2005/0131714 A1 | 6/2005 | Braunstein et al. |
| 2006/0106872 A1* | 5/2006 | Leban et al. ............... 707/104.1 |
| 2006/0224430 A1* | 10/2006 | Butt ................................... 705/8 |
| 2007/0033091 A1* | 2/2007 | Ravikumar et al. ............... 705/9 |

FOREIGN PATENT DOCUMENTS

EP 1533733 A1 5/2005

OTHER PUBLICATIONS

Garcia et al., "Voting on the Agenda: The Key to Social Efficient Meetings," International Journal of Project Management, 2005, pp. 17-24, v. 23 issue 1.
Ito et al., "An Agenda-Scheduling System Based on Persuasion Among Agents," Information Systems and Technologies for Network Society, 1997, pp. 1-8, Fukuoka, Japan.
Sen et al., "Satisfying User Preferences While Negotiating Meetings," 1997, pp. 1-34, Department of Mathematical & Computer Sciences, The University of Tulsa, Tulsa Oklahoma.

* cited by examiner

*Primary Examiner* — Thomas Dixon
(74) *Attorney, Agent, or Firm* — Raymond Szeto; Hoffman Warnick LLC

(57) ABSTRACT

The system and method of the present invention allows a Chair to a meeting to pre-define an agenda in the meeting invitation and to send the meeting invitation to the Invitees/Attendees. The Invitees/Attendees receive the meeting notice to determine whether they can attend the meeting during the time/date specified. In the event that the Invitees/Attendees can only attend a portion of the meeting, the Invitees/Attendees are given an option to request reordering of agenda items. After receiving enough receipts, the Meeting Chair can decide to reorder the agenda items and send an update to Invitees/Attendees prior to the meeting or not to reorder and the original agenda stands.

17 Claims, 6 Drawing Sheets

SYSTEM AND METHOD FOR REORDERING MEETING AGENDA ITEMS PRIOR TO THE OCCURRENCE OF THE MEETING BASED UPON PARTIAL PARTICIPATION BY THE MEETING PARTICIPANTS

FIELD OF THE INVENTION

The invention relates generally to scheduling agenda items for meetings, and, more particularly, to a system and method for reordering meeting agenda items prior to the occurrence of the meeting based on partial participation in the meeting by the meeting participants.

BACKGROUND OF THE INVENTION

Corporate users have very busy schedules and, as such, it is quite hard to schedule meetings with a large audience. It is especially difficult when the desired meeting has a long duration due to the large number of agenda items which need to be discussed with the large audience. For instance, if a meeting is to be 3 hours long and the invitee list has 20 or more invitees ("Invitees/Attendees"), it is unlikely in today's business environment that the host ("Host" or "Chair" will be used interchangeably) will be able to find a 3-hour span where each and every Invitee/Attendee will have no conflicts. It is much more likely that the Chair will be able to find a 3-hour span where each Invitee/Attendee will be able to attend a portion of the meeting but not the entire meeting. Further, of the twenty Invitees/Attendees (in the previous example), some Invitees/Attendees may be required for the entire meeting, some Invitees/Attendees may be required for a specific portion of the meeting, while others may be optional for the entire meeting. Furthermore, it may be that an Invitee/Attendee is interested in, though not required for, in a portion of the meeting.

Meetings are driven by meeting agendas. The agenda, which is a list of matters to be taken up at the meeting, is created by the Chair and is usually distributed to a meeting's Invitees/Attendees prior to the meeting, so that they will be aware of the subjects to be discussed, and are able to prepare for the meeting accordingly. The meeting is generally portioned into time segments, each segment being consumed by an agenda item.

A problem arises when an Invitee/Attendee is interested in an agenda item but has a conflict during the time segment designated for that particular agenda item. It is even more critical when the Invitee/Attendee is required for an agenda item. In many cases, however, the Invitee/Attendee has a conflict during the time segment designated for that particular agenda item and is available for other time segments but is not interested in or required for the agenda items designated for his available time slots or segments. As such, the Invitee/Attendee would like to have the Chair reorder the agenda list so that the Invitee/Attendee can attend the meeting during the time segment having the agenda item(s) which the Invitee/Attendee is required for or interested in. Presently, in order for this to happen, Invitee/Attendee would have to contact the Chair personally and request a reordering of the agenda items so that Invitee/Attendee would be able to attend the relevant portion of the meeting. However, with only the one reorder request from the Invitee/Attendee, the Chair would be justifiably hesitant to reorder the agenda as he doesn't have enough information to make an educated decision about the agenda re-ordering given that other people accepted invite assuming the original order. Thus, it can be seen that the ordering of agenda items is very important. It is also important that the agenda be finalized as far ahead of the meeting as possible so that the Invitees/Attendees can plan accordingly.

Thus, it can be seen that it is difficult to discuss/share/collaborate in a meeting with a large audience on multiple agenda items where Invitees/Attendees can only attend a portion of the meeting ("partial meeting participation"). The Chair, who creates the agenda and the order of agenda items, generally includes, in the meeting notice (calendar invites) the list predefined agenda items and the time segments which are assigned to each agenda item. The list, many times, has such agenda items ordered randomly. If partial meeting participation is accepted, and if some of the invitees cannot be present for the entire meeting duration, this agenda items ordering becomes very important.

In view of the foregoing, a need exists to overcome these problems by providing a system and method for reordering meeting agenda items prior to the occurrence of the meeting based upon feedback from meeting participants who are only able to or desire to attend a portion of the meeting and not the entire meeting ("partial participation").

BRIEF SUMMARY OF THE INVENTION

The system and method of the present invention allows a Chair to a meeting to pre-define an agenda in the meeting invitation and to send the meeting invitation to the Invitees/Attendees. The Invitees/Attendees receive the meeting notice to determine whether they can attend the meeting during the time/date specified. In the event that the Invitees/Attendees can only attend a portion of the meeting, the Invitees/Attendees are given an option to request reordering of agenda items. After receiving enough receipts, the Meeting Chair can decide to reorder the agenda items and send an update to Invitees/Attendees prior to the meeting or not to reorder and the original agenda stands.

In another embodiment of the present invention, the Chair makes the proposed agenda available to some or all of the Invitees/Attendees, collects reorder proposals, if any, and sends out the final invitation with the final agenda prior to the meeting.

In another embodiment of the present invention, the calendaring system of the Chair has an agenda creation tool to assist the Chair in creating and manipulating of the meeting agenda.

In yet another embodiment of the present invention, the calendaring system of the Invitee/Attendee has an agenda manipulating tool to assist the Invitee/Attendee in requesting a reordering of the meeting agenda.

In yet another embodiment of the present invention, the calendaring system of the Invitee/Attendee has an agenda manipulating tool to assist the Invitee/Attendee in requesting a reordering of the meeting agenda by providing preset selections for each agenda item, such as "Mandatory", "Preferred", and "Optional", to indicate to the Chair the priority of each reorder request. An "Optional" setting to a change request means that the Invitee will join the meeting regardless of the Chair's decision to honor the change request or not. A "Preferred" setting to an Invitee's change request means that the Invitee will join the meeting regardless of the Chair's decision to honor the change, however the Invitee strongly believes this change will help a factor of meeting (such as flow of the meeting/success of the meeting etc.). A "Mandatory" setting to an Invitee's change request means that the Invitee MAY automatically reject the meeting if Chair does not honor this request.

In yet another embodiment of the present invention, the calendaring system of the Chair has a response collection component for collecting Invitees'/Attendees' responses and reorder requests, parsing out the reorder request specifics and comparing the results against predefined parameters set by the Chair or set as default.

The illustrative aspects of the present invention are designed to solve one or more of the problems herein described and/or one or more other problems not discussed.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention, in which.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As used herein, unless otherwise noted, the term "set" means one or more (i.e., at least one) and the phrase "any solution" means any now known or later developed solution. Additionally, the term "data store" means any type of memory, storage device, storage system, and/or the like, which can temporarily or permanently store electronic data, and which can be included in a storage and/or memory hierarchy (collectively referred to herein as a "memory hierarchy") for a computer system.

Figure 1:
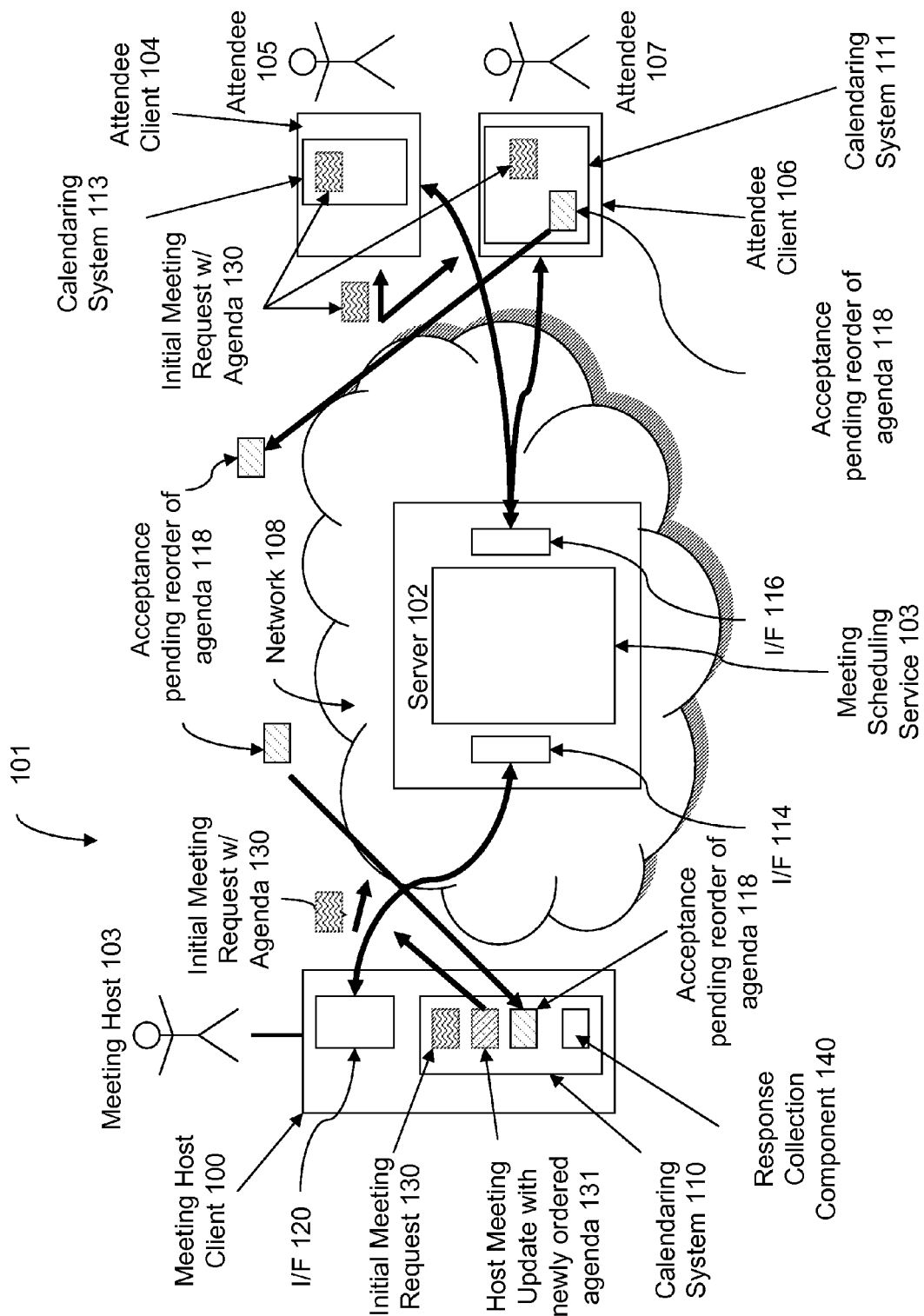
FIG. 1 is a block diagram of the system of the present invention.

FIG. 1 illustrates the system of the present invention as 101. System 101 has a Meeting Host Client 100, a Meeting Scheduling Service 103 and Attendee Clients 104, 106. Meeting Host Client 100, which provides a UI into System 101 for and takes direction from Meeting Host 103, has an I/F 120 for interfacing with the Network 108 and Server 102. Likewise, Attendee Clients 104, 106, which provide a UI into System 101 for and take direction from Attendees (Invitees) 105, 107, have interface components for interfacing with the Network 108 and Server 102. Meeting Host Client 100 has a Calendaring System Component 110 for allowing the Meeting Host Client 100 to request meetings, to keep an electronic calendar, and for receiving meeting requests from others. Likewise, Attendee Clients 104, 106 each has a Calendaring System Component 113, 111 for same purpose.

Alternatively, Meeting Host Client 100 and Attendee Clients 104, 106 may be connected directly for communication in a "peer to peer" configuration. Server 102 is shown within a Network 108 which may be of the many various forms such as Internet, local area network (LAN), MAN, etc. Server 102 has an Interface (I/F) 114 and I/F 116 for interfacing with Meeting Host Client 100, and Attendee Clients 104, 106 (and others).

As shown in FIG. 1, Meeting Host Client 100 creates an Initial Meeting Invitation (or "Invite") 130 using his Calendaring System 110. The Initial Meeting Invite 130 has the typical fields of Meeting Subject, Meeting Location, Meeting Chair, Invitees, etc. In addition, it has an agenda of the meeting which is created by the meeting chair. (In business meetings of deliberative bodies, the "agenda" may also be known as the orders of the day. The agenda is usually distributed to a meeting's participants prior to the meeting, so that they will be aware of the subjects to be discussed, and are able to prepare for the meeting accordingly.) The elements of the meeting invitation are seen more clearly in FIG. 2.

Figure 2:
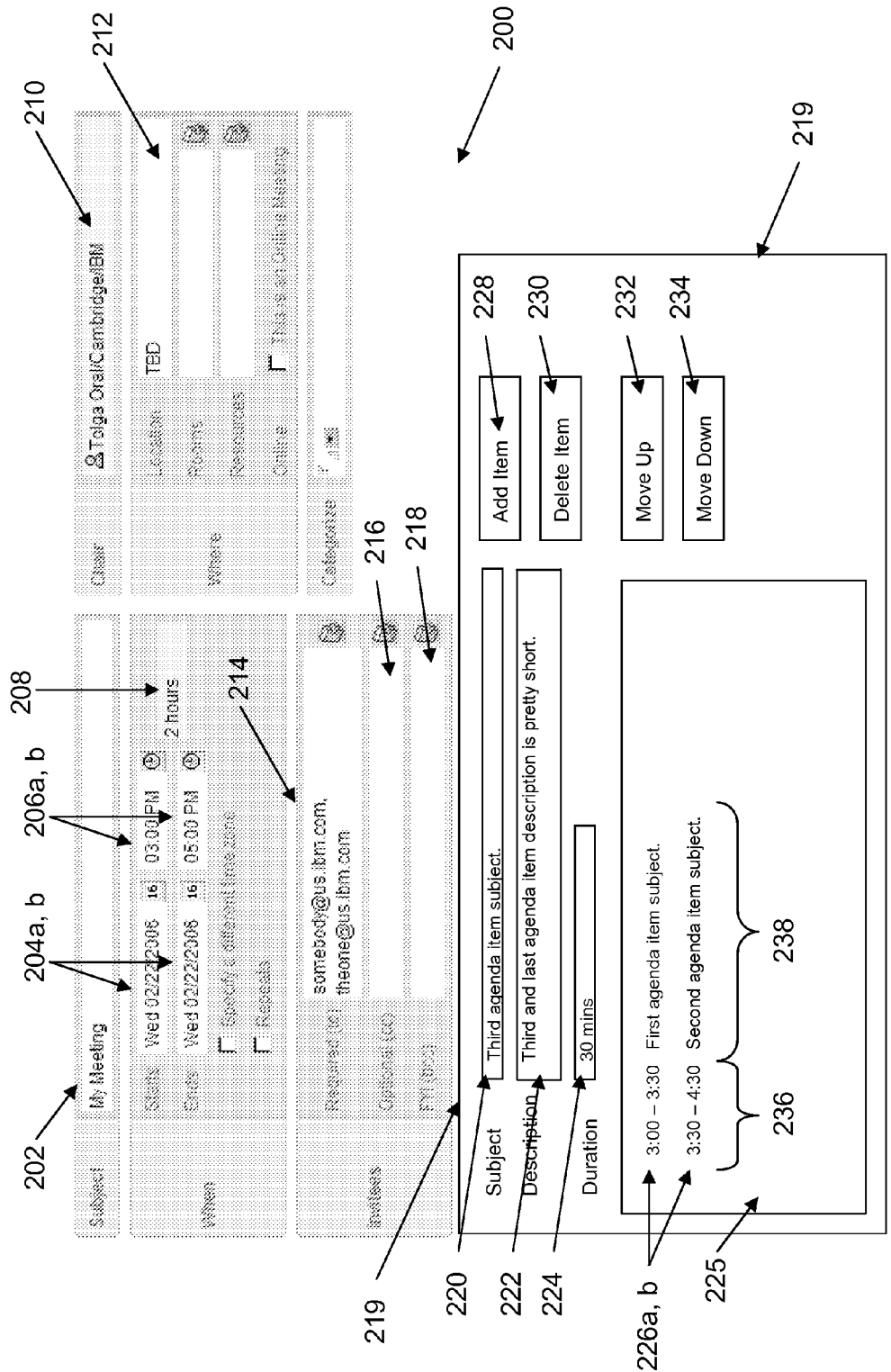
FIG. 2 illustrates a user interface or screen for creating a meeting invite with agenda creation tool of the present invention provided at the bottom of the screen.

In FIG. 2, a Host UI 200 for setting up a meeting is shown. Host Client UI 200 has many of the fields that typical meeting invitations have such as Meeting Subject 202, Starts Date 204a and Time 206a, Ends Date 204b and Time 206b, Meeting Chair (or Host) 210, Location 212 and Invitees (Attendees or Users)—Required 214, Optional 216 and FYI 218. In addition, the Host Client UI 200 has an Agenda Organizing section 219 for assisting the Host (Chair) in creating and organizing an agenda for the proposed meeting. Agenda Organizing section 219 has an Agenda Subject field 220, a Description field 222, Meeting Duration field 224, and an Agenda Field 225. Agenda Field 225 presently has Agenda Items 226a, b. The Agenda Items are arranged in a tabular manner such that there is a Time Field (having a start time and an ending time) 236 and a Subject Field 238. Time Field 236 and Subject Field 238 are represented as columns. Along the right hand side of the Agenda Organizing section 219 are numerous action buttons, i.e., Add Item button 228, Delete Item button 230, Move Up button 232 and Move Down button 234.

The process in which the Host, via Meeting Host Client 210, establishes the agenda is straight-forward. Assuming the Host has previously filled in the meeting subject, location, invitee and starts and ends fields, the Host then fills in the Agenda Subject field 220 in the Agenda Organizing section 219 with the subject matter of the specific agenda item. The Host then fills the Description field 222 having a more detailed description of the particular agenda item as well as the Duration field 224 which specifies the duration of that particular agenda item. Upon the Host selecting the Add Item 228 action button, the new agenda item is added to the agenda in the Agenda Organizing section 219 at the bottom of the then existing agenda. In the present example, the agenda item "Third agenda item subject" would be placed below agenda item "second agenda item subject" 226b and would have a start time of 4:30 and an end time of 5:00. The 4:30-5:00 time period would be the third agenda item's time segment or time slot.

After setting the agenda listing of first, second and third agenda item subjects, the host is then able to edit the list by selecting the desired agenda item to edit and selecting the Delete Item 230, Move Up 232 or Move Down 234 action buttons; the Delete Item 230 action button deleting the selected agenda item, Move Up 232 action button moving the selected agenda item up in the agenda list to the next previous time slot or Move Down 234 action button moving the selected agenda item down in the agenda list to the next subsequent time slot.

Referring back to FIG. 1, the Meeting Host Client 100 transmits the Initial Meeting Request 130 having an agenda created by the Meeting Host Client 100 to Meeting Scheduling Service 103 which forwards the Initial Meeting Request 130 to Attendee Clients 104, 106. Attendee Clients 104, 106 receive the Initial Meeting Request 130 in their respective Calendaring Systems 113, 111 and the Attendees, via Attendee Clients 104, 106, examine the invitation details, first, to determine if they can attend at all. Many times, as noted above, an attendee may not be able to attend the entire meeting due to other commitments or, alternatively, the attendee has interest or need in attending for a particular agenda item or two. If that is the case, each attendee determines which agenda items he is required to attend and which he is not and has no desire to attend. Sometimes, the attendee has a conflict in that he has a previous commitment which overlaps an agenda item where he is required to attend. The method and system of the present invention solves this problem.

If that is the case, in this example, Attendee 107 reorders the agenda to his liking or requirements, accepts the meeting invite with Acceptance of Meeting Invite Pending Reorder of Agenda 118 which is passed back to the Host 103. The Host 103 has the option of accepting the agenda list reorder proposed by Attendee 107 in which case Host 103 sends to all Invitees (Attendees) a Host Meeting Update with Newly Ordered Agenda 131. Alternatively, Host 103 may reject the agenda list reorder proposed by Attendee 107 in which case the Initial Meeting Agenda List remains in effect. More will be discussed regarding this herein below.

The Meeting Host Client's Calendaring System 110 provides optional tools for the Host (Chair) to create a meeting associated with agenda items. Host would pick a certain order for the agenda items as he thinks fits best.

1. These tools can be formal agenda building tools where Host can associate meta information about agenda such as title, description, possible duration, etc.
2. There may be no tools provided but the agenda is built by Host entering a formatted text as commonly done in some calendar applications, such as IBM's Lotus® Notes® Calendar invitations Alternatively, agenda items might automatically assigned to certain time slots if estimated durations are provided by the Host or they could be listed as first, second and so forth.

When an invitee/attendee receives the meeting invitation he/she would be presented with an agenda reordering tool. This tool may allow invitee/attendee to:

Mark which agenda items he/she is interested in and in what order of priority;

Allow him to propose changes to agenda item order;

Allow him to define if changes proposed are optional (he will join meeting regardless), preferred (he will join meeting regardless but he believes his proposed agenda order fits better for the purpose of the meeting) or mandatory (he won't be attending if changes don't get applied, usually for the reason that invitee/attendee cannot or may not be able to make the full length of the meeting and/or he is interested only in subset of agenda items). Mandatory changes might be used in very large meetings. Or to be said in another way, an "Optional" setting to a change request means that the Invitee will join the meeting regardless of the Chair's decision to honor the change request or not. A "Preferred" setting to an Invitee's change request means that the Invitee will join the meeting regardless of the Chair's decision to honor the change, however the Invitee strongly believes this change will help a factor of meeting (such as flow of the meeting/success of the meeting etc.). A "Mandatory" setting to an Invitee's change request means that the Invitee MAY automatically reject the meeting if Chair does not honor this request.

Figure 3:
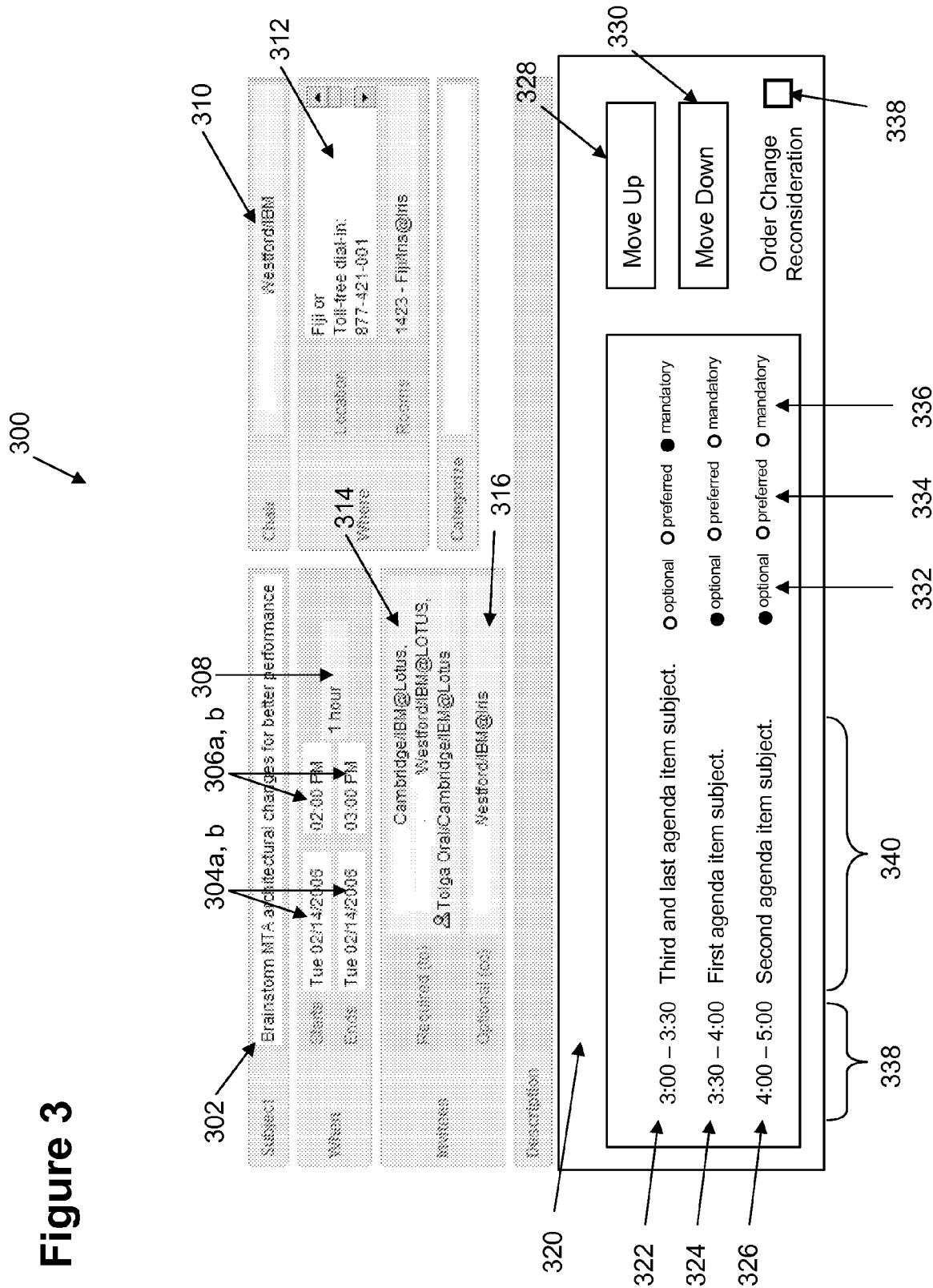
FIG. 3 illustrates a user interface or screen of an invite or invitation that an invitee (user or attendee) receives from the host illustrating an agenda manipulation UI of the present invention.

In FIG. 3, an Invitee/Attendee Client UI 300 for accepting a meeting invitation is shown. Like Host Client UI 200, Invitee/Attendee Client UI 300 has many of the fields that typical meeting invitations have such as Subject 302, Starts Date 304*a* and Time 306*a*, Ends Date 304*b* and Time 306*b*, Duration 308, Meeting Chair (Host) 310, Location or Call-in Number 312 and Invitees (Attendees or Users)—Required 314 and Optional 316 (Invitees/Attendees don't see the FYI/bcc addresses). In addition, the Invitee/Attendee Client UI 300 has an Agenda Manipulation section 320 which itemizes the agenda for the proposed meeting and allows the Invitee/Attendee to reorder the agenda or to add the Invitee's/Attendee's personal information with respect to his preferences or availability. Agenda Manipulation section 320 in the present example has three Agenda Items 322, 324, 326, each having a start and stop time and a subject field. The Agenda list is configured in tabular format with the start/stop time fields forming one column 338 and the subject fields forming another column 340. Along the right hand side of the Invitee/Attendee Agenda Manipulation section 320 are two action buttons, i.e., Move Up button 328 and Move Down button 330. As in the Host Client UI 200, the Invitee/Attendee may select an agenda item and choose the Move Up 328 action button which moves the selected agenda item up in the agenda list to the next previous time slot or choose the Move Down 330 action button which moves the selected agenda item down in the agenda list to the next subsequent time slot.

Invitee/Attendee Agenda Manipulation section 320 further has radio buttons associated with each Agenda Item 322, 324, 326. These are the "Optional", "Preferred" and "Mandatory" 332, 334, 336. In the preferred embodiment, the initial meeting invitation would have all agenda items marked optional. Invitee/Attendee may or may not require any agenda order change but he can still express his preferences by selecting predetermined agenda order as preferred or mandatory. Invitee/Attendee Client UI 300, in the preferred embodiment, has convenience buttons to select all optional/preferred/mandatory as noted above. Invitee/Attendee Client UI 300 has a check box 338 asking for reconsideration if agenda order change. Invitee/Attendee Client UI 300 may have specified time slots or just ordering of agenda items 322, 324, 326 (#1, #2 etc.).

When Host receives enough amount of receipts from invitees (could be defined by the system or a user preference), Host can decide to reorganize the order of agenda items. The provided agenda creation/reorder tool might aid Host or Host could reorganize depending on specific people choices.

As shown in FIG. 1, Calendaring System 110 of Host Client 100 has a Response Collection Component 140A. Response Collection Component 140A collects the Invitee/Attendee responses and reorder requests. The Response Collection Component 140A can perform any number of functions which would aid the Host 103 in determining whether a reordering of the agenda is the appropriate step to take. For instance, the Host 103 may wish to reorder the agenda only after receiving responses from a specific percentage of the number of initial invitations, such as 70% or 100%. As such, Response Collection Component 140A would tabulate the total number of responses and compare against the number of invitations, tabulate the various reorder requests and report to the Host 103. Alternatively, the Host 103 may choose that responses from particular Invitees/Attendees are more important than responses from other Invitees/Attendees. As such, Response Collection Component 140A would receive the responses and reorder requests and identify the responding Invitees/Attendees, tabulate the various reorder requests and report to Host. These are some examples of the automatic examination of responses/reorder requests but many more are available. This function is especially helpful in very large meetings where many responses/reorder requests are received. Of course, the Host may manually review each response/reorder request and make decisions accordingly.

Figure 4:
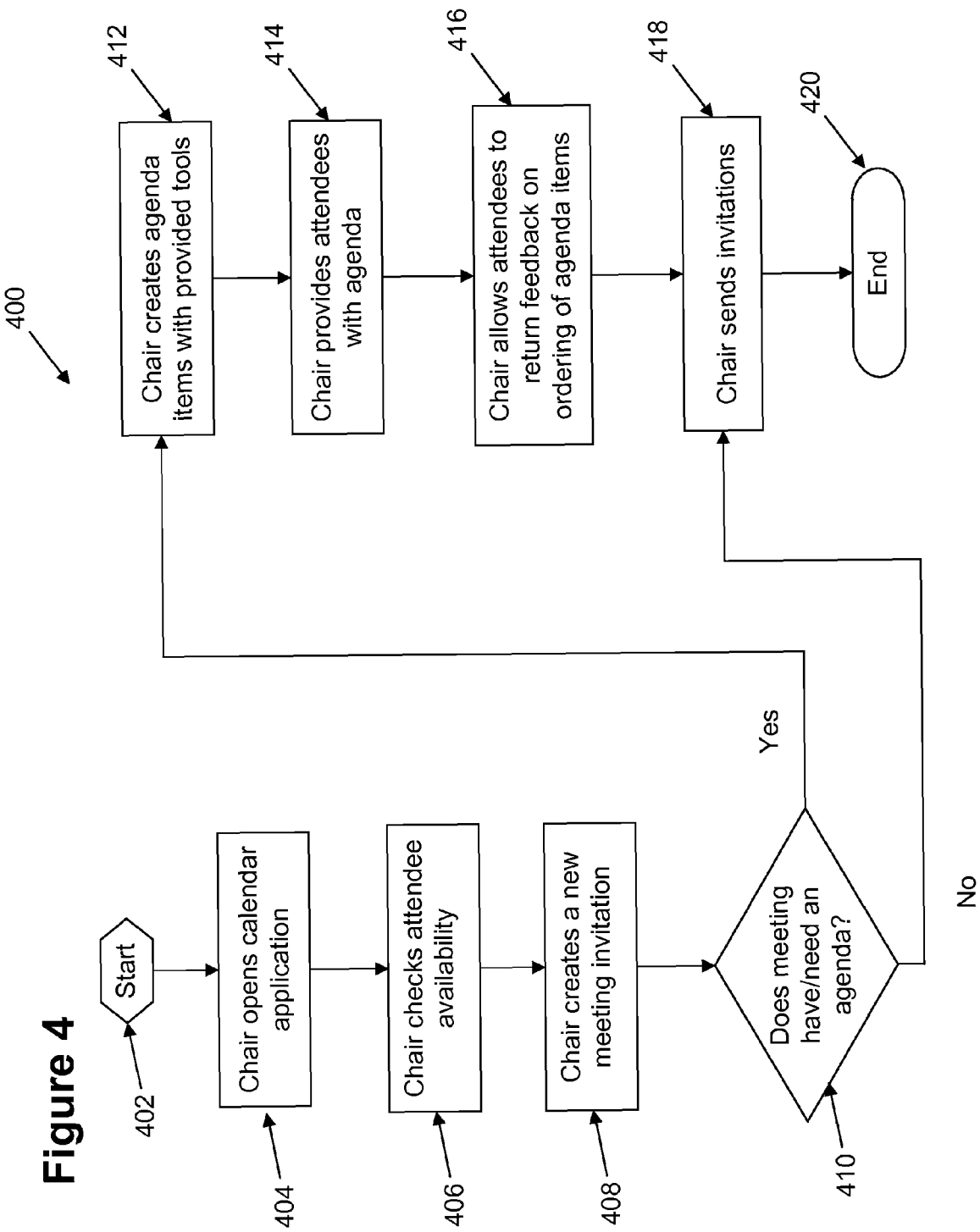
FIG. 4 is a flow chart of a process of the present invention where the Chair may schedule a meeting and set up an agenda.

FIG. 4 is a flow chart illustrating the process 400 of a Host setting up an agenda and scheduling a meeting which starts at 402. At 404, the Host (Chair) opens the calendar application and, at 406, Chair checks attendee availability. This, of course, is not a required step but it may be desirable to check the availability of the required attendees of the meeting. Also, it should be noted that the Host doesn't need to be the person who sets the agenda and schedules the meeting as it could be an administrative assistant or other party whom the Host designates. At 408, Chair creates a new meeting invitation and, at 410, the Chair determines whether the meeting needs an agenda and, if not, at 418, Chair sends invitations to Invitees/Attendees. If so, Chair creates agenda items with provided tools and, at 414, Chair provides Invitees/Attendees with the agenda prior to the occurrence of the meeting. Chair's providing the agenda to the Invitees/Attendees can take one of many forms, such as including the agenda in an initial meeting request, or it can be, for instance, posted on an internal website accessible by some or all of the Invitees/Attendees. Other forms are readily apparent. Chair allows Invitees/Attendees to return feedback on the order of agenda items at 416 and may or may not change the order of the agenda based upon the feedback. At this point, Chair may choose to utilize the Response Collection Component 140 having a predefined decision or tabulating algorithm. At 418, Chair sends final invitations to Invitees/Attendees and the process ends at 420.

Figure 5:
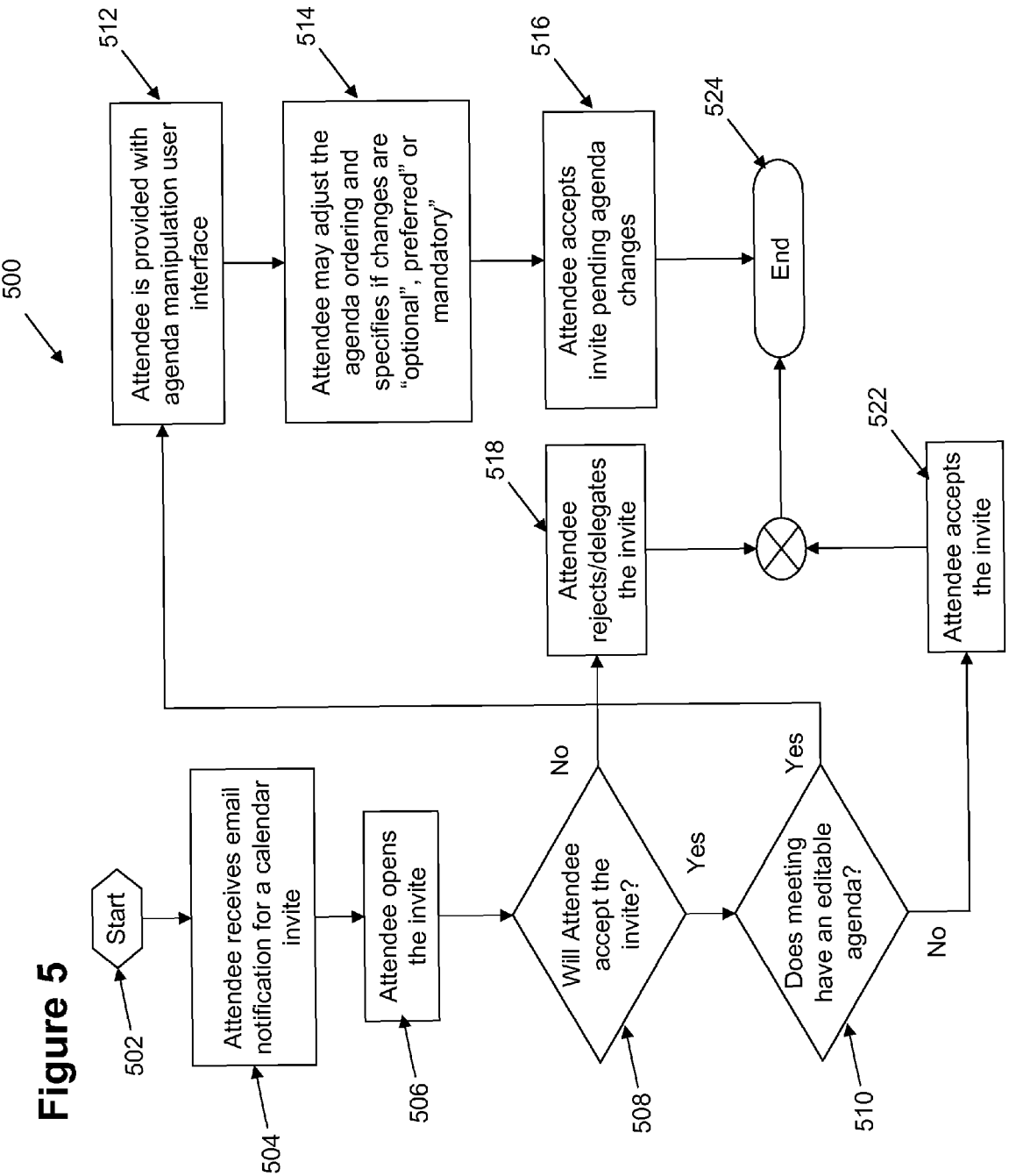
FIG. 5 is a flow chart of a process of the present invention where the Invitee/Attendee receives the meeting invitation, edits the agenda and Invitee/Attendee accepts the invite pending the agenda changes.

FIG. 5 is a flow chart illustrating the process 500 of an Invitee/Attendee receiving a meeting invitation and reordering the agenda if desired or necessary which starts at 502. At 504, the Invitee/Attendee receives the email notification for the calendar invite and, at 506, the Invitee/Attendee opens the invite. At 508, the Invitee/Attendee determines whether he will accept the invite and, if not, the Invitee/Attendee rejects the meeting invite or assigns a delegate to attend the meeting and the process ends at 524. If he will attend the meeting, at 510, he determines whether the meeting has an editable agenda and, if not, the Invitee/Attendee accepts the invite at 522 and the process ends at 524. If the meeting has an editable agenda, the Invitee/Attendee, at 512, is provided with an agenda manipulation user interface and, at 514, Invitee/Attendee may adjust the agenda ordering and specifies if changes are "optional", "preferred" or "mandatory". At 516, Invitee/Attendee accepts the invite pending agenda changes and the process ends at 524.

Figure 6:
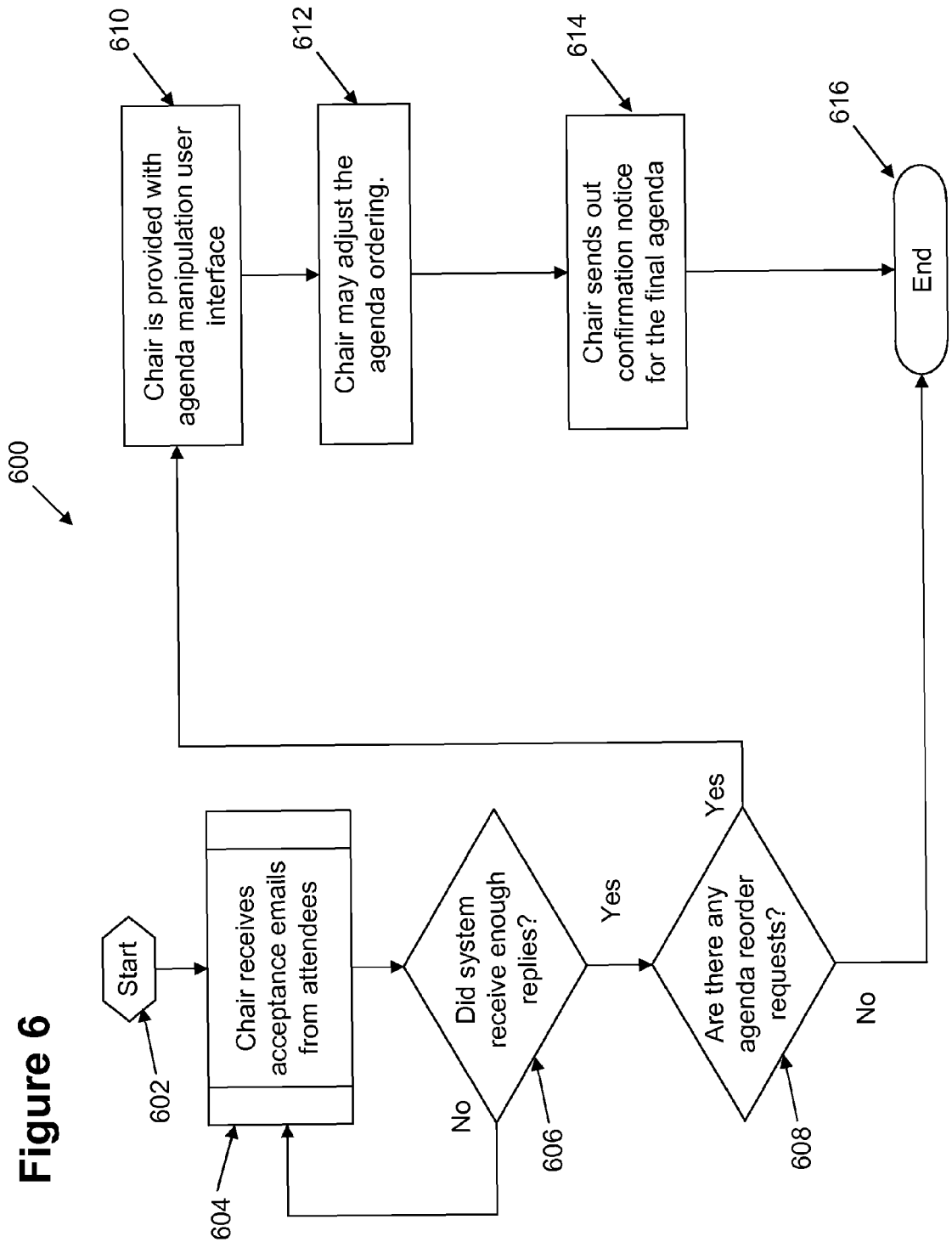
FIG. 6 is a flow chart of a process of the present invention where the Chair receives acceptance emails relating to the meeting invitation, and, if there are enough responses, may accept the agenda changes and send out the final agenda.

FIG. 6 is a flow chart illustrating the process 600 of the Host starting at 602 and, at 604, the Host receives the meeting acceptance emails from the Invitees/Attendees. At 606, the system determines whether if the system has received enough replies from the Invitees/Attendees. This would be performed by the Response Collection Component 140. The threshold as to what number of replies is "enough" can be preset as a default for example in the system and, then customized by the Host for instance. For instance, the Host may wish that, prior to reordering the agenda based upon received feedback at that time, a specific number of attendees will need to have responded. Alternatively, it may be that the Host wishes that a specific number of certain required Invitees/Attendees have responded prior to reordering as opposed to a specific number of all Invitees/Attendees (which would include optional and FYI Invitees/Attendees). If the system did not receive enough replies (or whatever the chosen parameter is), the process moves back to 604 to receive more acceptance emails. If so, at 608, it is determined (by the Host or system) whether any agenda change reorders have been requested and, if not, the process ends at 616. If so, at 610, Chair is provided with an agenda manipulation user interface and, at 612, Chair may adjust the agenda ordering. At 614, Chairs sends out confirmation notice for the final agenda and the process ends at 616.

It should be noted that although many of the system components, such as Meeting Host Client's Calendaring System and Response Collection Component and Attendee's Calendaring Systems are discussed implicitly as being local clients, this invention should in no way be so limited. All of these functions could just as easily be performed at a central server by, for example, an Internet Service Provider (ISP). This would be readily apparent to one skilled in the art. The invention is intended to include this and other equivalents. It should also be noted that the term "process" and the term "method" should be considered to be equivalent.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method, in a system having a meeting scheduling service, for scheduling a meeting between a meeting host and at least one meeting invitee, the meeting host having a meeting host client and each at least one invitee having an invitee client, each host client and invitee client having calendaring systems for reordering meeting agenda items prior to the occurrence of the meeting based on partial participation in the meeting by meeting invitees, the method further, the method comprising the steps of:

a. receiving, using a computer server, by the meeting host client, meeting details from the meeting host;
   b. creating, using the computer server, by the meeting host client, an initial meeting agenda, the initial meeting agenda having at least two agenda items in an initial order, each agenda item having a unique time slot from the other agenda items and a subject, the initial order being based upon the time slots of the agenda items;
   c. providing, using the computer server, from the meeting host client, the initial meeting agenda to the at least one invitee via the invitee client prior to the occurrence of the meeting;
   d. receiving, using the computer server, at the host client from at least one invitee, a request to change the initial order of the agenda items such that at least two agenda items would have different time slots than their previous time slots, wherein the request of step d comprises an acceptance of the initial meeting request conditioned upon the approval of the initial order change request;
   e. determining, using the computer server, at the meeting host client, whether the initial order should be changed based upon the request;
   f. changing, using the computer server the initial order prior to the occurrence of the meeting based upon the request thereby creating a new meeting agenda and sending invitations having the new meeting agenda to the at least one invitees.

2. The method of claim 1 wherein step c comprises sending an initial meeting request having the initial meeting agenda therein to the at least one invitee.

3. The method of claim 2 wherein, in step c, the determining is done automatically by the meeting host client's calendaring system based upon parameters established by the meeting host.

4. The method of claim 3 wherein one of the parameters is a percentage of the initial meeting requests for which a response was received.

5. The method of claim 3 wherein one of the parameters is whether one or more specific invitees have responded.

6. A system for scheduling a meeting between a meeting host and at least one invitee and further reordering meeting agenda items prior to the occurrence of the meeting based on partial participation in the meeting by meeting invitees, the system comprising:
   a meeting host client having a calendaring system on a computer server for receiving meeting details from the meeting host and for creating a meeting request, the meeting host client calendaring system further for receiving meeting agenda details from the meeting host and for creating a meeting agenda for the meeting, the meeting agenda having at least two meeting agenda items in an initial order, each having unique time slots from the others, the meeting agenda being included in the meeting request, the meeting host client further having an interface for sending meeting requests to the at least one invitee and for receiving responses from the at least one invitee;
   an invitee client, for each at least one invitee, having an interface with the computer server for receiving meeting requests from the meeting host client and for sending meeting request responses to the meeting host client, each invitee client further having a calendaring system for allowing the associated invitee to examine the meeting request including the meeting agenda and the initial order of the meeting agenda items, each invitee client calendaring system further for enabling the associated invitee to change the initial order of the meeting agenda items to create a proposed order of meeting agenda items, the calendaring system including the proposed order of meeting agenda items in the meeting request response to be sent to the meeting host client, wherein the meeting request response including the proposed order of meeting agenda items further comprises an acceptance of the initial meeting request conditioned upon the approval of the proposed order of meeting agenda items; and
   the meeting host client further for allowing the meeting host to manipulate the initial order of the agenda items of the meeting request to create a final order of agenda items and for passing the final order of agenda items to the calendaring system for creating a final meeting request having the final order of agenda items sent to the at least one invitee.

7. The system of claim 6 wherein the meeting host client calendaring system further has a response collection component for collecting response from the at least one invitee and for providing, to the meeting host client, information related to the responses based upon parameter established by the meeting host to assist the meeting host in determining whether to accept the proposed order of agenda items.

8. The system of claim 7 wherein one of the parameters is a percentage of the initial meeting requests for which a response was received.

9. The system of claim 7 wherein one of the parameters is whether one or more specific invitees have responded.

10. The system of claim 6 wherein the invitee calendaring system has an agenda manipulation user interface (UI) having action buttons for moving the agenda items between time slots.

11. The system of claim 10 wherein the invitee agenda manipulation user interface (UI) further has user interface (UI) elements for each agenda item allowing the invitee to indicate to the meeting host which time slot changes are optional, preferred and mandatory.

12. The system of claim 6 wherein the meeting host calendaring system has a meeting host client agenda creation user interface (UI) having action buttons for moving the agenda items between time slots, for adding new agenda items and for deleting agenda items.

13. A computer program comprising program code stored on a non-transitory data store, which when executed, enables a computer system to implement the following steps, in a system having a meeting scheduling service, for scheduling a meeting between a meeting host and at least one invitee, and further for reordering meeting agenda items prior to the occurrence of the meeting based on partial participation in the meeting by the invitees, the system further having a meeting host client for the meeting host and an invitee client for each at least one invitee, the meeting host client and each invitee client having calendaring systems, the steps comprising:
   a. receiving, by the meeting host client, meeting details from the meeting host;
   b. creating, by the meeting host client, an initial meeting agenda, the initial meeting agenda having at least two agenda items in an initial order, each agenda item having a unique time slot from the other agenda items and a subject, the initial order being based upon the time slots of the agenda items;
   c. providing, from the meeting host client, the initial meeting agenda to the at least one invitee via the invitee client prior to the occurrence of the meeting;
   d. receiving, at the host client from at least one invitee, a request to change the initial order of the agenda items such that at least two agenda items would have different time slots than their previous time slots, wherein the request of step d comprises an acceptance of the initial meeting request conditioned upon the approval of the initial order change request;
   e. determining, at the meeting host client, whether the initial order should be changed based upon the request;
   f. changing the initial order prior to the occurrence of the meeting based upon the request thereby creating a new meeting agenda and sending invitations having the new meeting agenda to the at least one invitees.

14. The computer program of claim 13 wherein step c comprises sending an initial meeting request having the initial meeting agenda therein to the at least one invitee.

15. The computer program of claim 13 wherein, in step c, the determining is done automatically by the meeting host client's calendaring system based upon parameters established by the meeting host.

16. The computer program of claim 15 wherein one of the parameters is a percentage of the initial meeting requests for which a response was received.

17. The computer program of claim 15 wherein one of the parameters is whether one or more specific invitees have responded.

* * * * *